United States Patent
Nakamura et al.

(10) Patent No.: US 8,877,675 B2
(45) Date of Patent: Nov. 4, 2014

(54) EXHAUST GAS PURIFYING CATALYST AND PRODUCING METHOD THEREOF

(75) Inventors: Masanori Nakamura, Yokosuka (JP); Hironori Wakamatsu, Yokohama (JP); Tetsuro Naito, Yokohama (JP); Katsuo Suga, Yokohama (JP); Hiroto Kikuchi, Hiratsuka (JP); Kazuyuki Shiratori, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1168 days.

(21) Appl. No.: 12/007,335

(22) Filed: Jan. 9, 2008

(65) Prior Publication Data
US 2008/0167181 A1  Jul. 10, 2008

(30) Foreign Application Priority Data
Jan. 10, 2007  (JP) .................................. 2007-002337

(51) Int. Cl.
*B01J 23/40* (2006.01)
*B01J 23/42* (2006.01)
(Continued)

(52) U.S. Cl.
CPC .............. *B01J 35/04* (2013.01); *B01J 35/0006* (2013.01); *B01D 2255/102* (2013.01); *B01J 23/002* (2013.01); *B01D 2255/407* (2013.01); *B01J 2523/00* (2013.01); *F01N 3/2803* (2013.01); *F01N 2370/02* (2013.01); *B01J 23/38* (2013.01); *B01D 53/945* (2013.01); *B01J 37/0244* (2013.01); *B01D 2255/908* (2013.01); *Y02T 10/22* (2013.01); *B01D 2255/9022* (2013.01); *F01N 2510/06* (2013.01)

USPC ........... 502/327; 502/302; 502/304; 502/339; 502/341; 502/346; 502/349

(58) Field of Classification Search
CPC ............ B01J 23/38; B01J 23/42; B01J 23/44; B01J 23/464; B01J 23/02; B01J 23/04; B01J 23/10; B01D 53/94
USPC .................... 502/325–328, 302–304, 527.15, 502/339–341, 344, 527.11, 527.12
See application file for complete search history.

(56) References Cited

U.S. PATENT DOCUMENTS

| 4,248,852 A | * | 2/1981 | Wakabayashi et al. ........ 423/626 |
| 5,004,859 A | * | 4/1991 | Schmidt et al. ................ 585/741 |

(Continued)

FOREIGN PATENT DOCUMENTS

| EP | 1 241 329 A2 | 9/2002 |
| EP | 1 779 930 A1 | 5/2007 |

(Continued)

OTHER PUBLICATIONS

Machine translation of JP 2003-117393 A, originally published Apr. 2003.*

*Primary Examiner* — Anthony J Zimmer
(74) *Attorney, Agent, or Firm* — Foley & Lardner LLP (57) ABSTRACT

An exhaust gas purifying catalyst includes: a catalyst particle unit having at least noble metal with a catalytic function, first oxides on which the catalyst noble metal is supported, and second oxides covering the first oxides on which the noble metal is supported. In catalyst powder formed of an aggregate of plural pieces of the catalyst particle units, at least one type of compounds selected from the group consisting of a transition element, an alkali earth metal element, an alkali metal element, and a rare earth element, which is a promoter component, are contained.

17 Claims, 2 Drawing Sheets

(51) Int. Cl.

| | | |
|---|---|---|
| *B01J 23/10* | (2006.01) | |
| *B01J 23/44* | (2006.01) | |
| *B01J 23/02* | (2006.01) | |
| *B01J 23/06* | (2006.01) | |
| *B01J 23/70* | (2006.01) | |
| *B01J 23/72* | (2006.01) | |
| *B01J 23/00* | (2006.01) | |
| *B01J 35/00* | (2006.01) | |
| *F01N 3/28* | (2006.01) | |
| *B01J 35/04* | (2006.01) | |
| *B01J 23/38* | (2006.01) | |
| *B01D 53/94* | (2006.01) | |
| *B01J 37/02* | (2006.01) | |

(56) References Cited

U.S. PATENT DOCUMENTS

| | | | | |
|---|---|---|---|---|
| 5,017,541 | A * | 5/1991 | Schmidt et al. | 502/169 |
| 5,039,647 | A * | 8/1991 | Ihara et al. | 502/251 |
| 6,022,825 | A * | 2/2000 | Andersen et al. | 502/303 |
| 6,294,140 | B1 | 9/2001 | Mussmann et al. | |
| 6,306,794 | B1 * | 10/2001 | Suzuki et al. | 502/304 |
| 6,348,430 | B1 | 2/2002 | Lindner et al. | |
| 7,504,359 | B2 * | 3/2009 | Ogyu et al. | 502/439 |
| 7,713,908 | B2 * | 5/2010 | Yamamoto et al. | 502/300 |
| 7,722,854 | B2 * | 5/2010 | Watson et al. | 423/652 |
| 7,985,706 | B2 * | 7/2011 | Okada et al. | 502/216 |
| 2004/0265225 | A1 * | 12/2004 | Watson et al. | 423/652 |
| 2006/0043651 | A1 * | 3/2006 | Yamamoto et al. | 264/661 |
| 2006/0166820 | A1 * | 7/2006 | Ogyu et al. | 502/439 |
| 2008/0120970 | A1 * | 5/2008 | Hilgendorff et al. | 60/299 |
| 2009/0105511 | A1 * | 4/2009 | Okada et al. | 585/434 |

FOREIGN PATENT DOCUMENTS

| | | |
|---|---|---|
| JP | 63-176537 U | 11/1988 |
| JP | 08-131830 A | 5/1996 |
| JP | 2003-47849 A | 2/2003 |
| JP | 2003-117393 A | 4/2003 |
| JP | 2004-36497 A | 2/2004 |
| JP | 2005-000829 A | 1/2005 |
| JP | 2005-000830 A | 1/2005 |

* cited by examiner

EXHAUST GAS PURIFYING CATALYST AND PRODUCING METHOD THEREOF

BACKGROUND OF THE INVENTION

1. Field of the Invention

The present invention relates to an exhaust gas purifying catalyst suitable for application to processing for purifying exhaust gas discharged from an internal combustion engine, and relates to a producing method thereof.

2. Description of the Related Art

In recent years, in order to remove toxic substances such as a hydrocarbon compound (HC), a carbon monoxide (CO) and a nitrogen oxide ($NO_x$), which are contained in exhaust gas discharged from an internal combustion engine, an exhaust gas purifying catalyst has been widely used, in which noble metal particles of platinum (Pt) and the like are supported on a metal oxide support of alumina ($Al_2O_3$) or the like. In the conventional exhaust gas purifying catalyst, in order to enhance durability of the noble metal particles against variations of the ambient atmosphere, a large amount of the noble metal particles are used. However, it is not desirable to use the large amount of noble metal particles from a viewpoint of protecting earth resources.

From such a background, recently, attempts have been made, which are to enhance the durability of the noble metal particles in such a manner that transition metal such as cerium (Ce) and manganese (Mn) or a transition metal compound, which functions as an oxygen storage component (OSC) material, is disposed in the vicinities of the noble metal particles by an impregnation method, and the variations of the ambient atmosphere of the noble metal particles are suppressed by the transition metal or the transition metal compound (refer to Japanese Patent Laid-Open Publications No. H8-131830 (published in 1996), No. 2005-000829, No. 2005-000830 and No. 2003-117393). Note that, in accordance with such a method, enhancement of activity of the noble metal particles can also be expected in addition to the enhancement of the durability of the noble metal particles.

SUMMARY OF THE INVENTION

In the case of suppressing the variations of the ambient atmosphere of the noble metal particles by the compound of the transition metal, it is necessary that both of the noble metal particles and compound particles of the transition metal be microparticles, and that both thereof contact each other. However, in the case of using the impregnation method, both of the noble metal particles and the compound particles of the transition metal do not become the microparticles even if both thereof can be contacted with each other. Alternatively, both of the above can not be contacted with each other or an amount thereof capable of being contacted with each other is small even if both become the microparticles, and accordingly, it is difficult to dispose the compound particles of the transition metal in the vicinities of the noble metal particles as designed. Moreover, in the case of achieving the durability of the noble metal particles, it is desirable to set an average particle diameter of the noble metal particles at 2 [nm] or more, and in the case of achieving the activity of the noble metal particles, it is desirable to set an average particle diameter at 5 [nm] or less. However, in the case of using the impregnation method, the average particle diameter of the noble metal particles becomes 1.5 [nm] or less, and accordingly, it is difficult to expect the durability enhancement and activity enhancement of the noble metal particles.

Moreover, the compound of the transition metal is likely to be solid-solved in alumina widely used as the metal oxide support, and accordingly, only if the compound of the transition metal is merely disposed in the vicinities of the noble metal particles, then it is difficult to obtain an effect of enhancing the activity of the noble metal particles. Note that a method of supporting the compound of the transition metal on a support that is not solid-solved in the compound of the transition metal is considered in order to solve such a problem; however, in the case of using this method, the compound of the transition metal moves in a high-temperature atmosphere, and the respective pieces of the compound of the transition metal are contacted with one another, whereby the compound of the transition metal coagulates. Moreover, in order to prevent such coagulation, there is also considered a method of producing compound particles of the transition metal with a large surface area by using a reversed micelle method; however, since an organic solvent is used in this method, production cost and a load on the environment are large.

In order to solve the above-described problems, an exhaust gas purifying catalyst according to the present invention is summarized to include: a catalyst particle unit having at least noble metal with a catalytic function, first oxides on which the noble metal is supported, and second oxides covering the first oxides on which the catalyst noble metal is supported, wherein at least one type of compounds selected from the group consisting of a transition element, an alkali earth metal element, an alkali metal element, and a rare earth element, which is a promoter component, are contained in catalyst powder formed of an aggregate of plural pieces of the catalyst particle units.

Moreover, a method of producing an exhaust gas purifying catalyst according to the present invention is a method of producing the above-described exhaust gas purifying catalyst summarized to include: supporting the catalyst noble metal on the first compounds; covering the first compounds supporting the catalyst noble metal with a mixture of boehmite as a raw material of the second compounds and the compounds as the promoter component; and firing a resultant of THE mixture and the catalyst noble metal covered therewith at 500° C. or more.

BRIEF DESCRIPTION OF THE DRAWINGS

The above and further objects, features and advantages of the invention will more fully appear in the detailed description of embodiments of the invention, when the same is read in conjunction with the drawings, in which.

DETAILED DESCRIPTION OF THE INVENTION

A description will be made below of embodiments of an exhaust gas purifying catalyst of the present invention while using the drawings.

Figure 1:
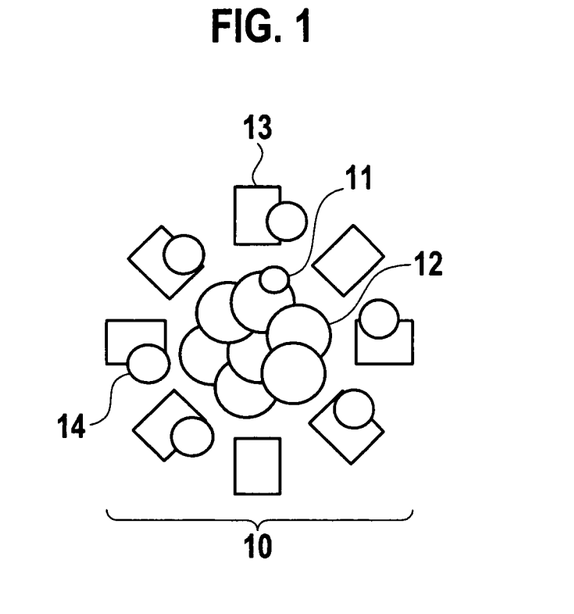
FIG. 1 is a schematic view of a catalyst particle unit in an exhaust gas purifying catalyst serving as an embodiment of the present invention.

FIG. 1 is a schematic view of a catalyst particle unit in an exhaust gas purifying catalyst serving as an embodiment of the present invention. A catalyst particle unit 10 of the exhaust gas purifying catalyst shown in FIG. 1 includes: a noble metal particle 11 having a catalytic function; first oxides 12 which support the noble metal particle 11, and suppress movement of the noble metal particle 11; second oxides 13 which cover the noble metal particle 11 and the first oxides 12, and suppress coagulation of the first oxides 12, the coagulation following mutual contact of the first oxides 12, as well as suppress the movement of the noble metal particle 11; and compounds 14 as a promoter component disposed in the vicinities of the second oxides. The compounds 14 contain at least one type of compounds selected from the group consisting of a transition element, an alkali earth metal element, an alkali metal element, and a rare earth element. Moreover, the catalyst particle unit 10 is formed to have a structure, in which a plurality of aggregates of the first oxides 12 supporting the noble metal particles 11 are covered with the second oxides 13, whereby the plurality of aggregates of the first oxides 12 supporting the noble metal particles 11 are separated from one another by the second oxides 13.

As a result of repeating an energetic research, the inventors of the present invention found that the noble metal particles are chemically bonded to the oxides, thus making it possible to chemically suppress the movement of the noble metal particles, and that the noble metal particles are covered with the other oxides, thus making it possible to physically suppress the movement of the noble metal particles. Moreover, the inventors found that both of the noble metal particles and the oxides are covered with the other oxides, thus making it possible to suppress the coagulation of the oxides as well as to suppress the movement of the noble metal particles.

In the catalyst particle unit 10 of the exhaust gas purifying catalyst, which is shown in FIG. 1 and configured based on the findings described above, the first oxides 12 contact and support the noble metal particle 11, whereby the first oxides 12 function as anchor members of the chemical bonding, and suppress the movement of the noble metal 11. Moreover, such a mode in which the noble metal particle 11 and the first oxides 12 are covered with the second oxides 13 is adopted, whereby the movement of the noble metal particle 11 is physically suppressed. Furthermore, the catalyst particle unit 10 includes the noble metal particle 11 and the first oxides 12 in a section separated from the others by the second oxides 13, thereby suppressing movement of the first oxides 12 beyond the section separated by the second oxides 13, and suppressing contact and coagulation thereof with the others. From these facts, without increasing the production cost and the load on the environment, the exhaust gas purifying catalyst having the structure of the catalyst particle unit 10 shown in FIG. 1 can prevent a decrease of catalyst activity, which may be caused by the coagulation of the noble metal particles 11, and further, can maintain the effect of enhancing the activity of the noble metal particles 11, which is brought by the first oxides 12. Hence, an exhaust gas purifying catalyst, which has high heat resistance and keeps excellent durability for a long period, can be obtained.

Moreover, in the catalyst particle unit 10 of the exhaust gas purifying catalyst of this embodiment, which is shown in FIG. 1, the compounds 14 as the promoter component are disposed in contact with the second oxides 13. It is effective that the promoter component is contained in the catalyst since performance of the catalyst can be enhanced. However, when the catalyst particle unit 10 having the above-described structure contains the promoter component, there has been an apprehension that an effect of containing the promoter component cannot be fully exerted depending on a mode of the structure in which the promoter component is contained. In detail, the structure of the catalyst particle unit 10 is extremely effective in enhancing heat resistance of the noble metal particle 11, and the noble metal particle 11 at a catalyst active site is covered with the second oxides 13, and the noble metal particle 11 contacts gas through micropores of the second oxides 13. Here, in a structure in which the promoter is added by impregnation supporting in a similar way to the conventional catalyst, there is an apprehension that the micropores of the catalyst may be closed by the promoter, gas diffusion may suffer a failure, and the gas may fail to reach the active site.

Therefore, in order to fully exert the effect of the promoter, it is necessary to dispose the promoter in a mode in which micropore closure is prevented as much as possible from occurring. Moreover, if the promoter component is disposed too apart from the noble metal particle, the effect of containing the promoter component becomes poor. In consideration for such factors, in the exhaust gas purifying catalyst of this embodiment, which is shown in FIG. 1, the compounds 14 as the promoter component are disposed so as not to contact the first oxides 12 but to contact the second oxides 13, and more specifically, disposed so as to contact the second oxides 13 at positions among the second oxides 13 adjacent to one another. The compounds 14 are provided so as to contact the second oxides 13 as described above, whereby the closure of the micropores in the catalyst particle unit, which are formed of the adjacent second oxides 13, are kept to the minimum, and the effect of containing compounds 14 can be exerted to the maximum.

Figure 2:
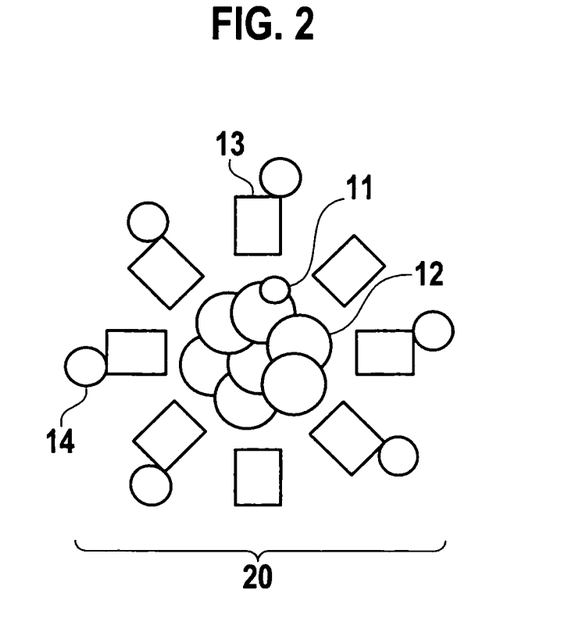
FIG. 2 is a schematic view of a catalyst particle unit in an exhaust gas purifying catalyst serving as another embodiment of the present invention.

FIG. 2 is a schematic view of a catalyst particle unit 20, showing another example of the exhaust gas purifying catalyst according to the present invention, in which the compounds 14 as the promoter component are disposed so as to contact the second oxides 13. Note that, in FIG. 2, the same reference numerals are assigned to the same constituents as those in FIG. 1. The catalyst particle unit 20 shown in FIG. 2 includes: the noble metal particle 11 having the catalytic function; the first oxides 12 which support the noble metal particle 11, and suppress the movement of the noble metal particle 11; the second oxides 13 which cover the noble metal particle 11 and the first oxides 12, and suppress the coagulation of the first oxides 12, the coagulation following the mutual contact of the first oxides 12, as well as suppress the movement of the noble metal particle 11; and the compounds 14 as the promoter component disposed in the vicinities of the second oxides. In the above-described point, the catalyst particle unit 20 is the same as the catalyst particle unit 10. Then, in the catalyst particle unit 20 shown in FIG. 2, the compounds 14 as the promoter component are disposed so as to contact the second oxides 13, and more specifically, disposed so as to contact outer circumferential surfaces of the second oxides 13. The compounds 14 are provided so as to contact the second oxides 13 as described above, whereby the closure of the micropores of the catalyst particle unit is suppressed effectively, and at the same time, the compounds 14 as the promoter component are provided close to the noble metal particle 11, and the effect of containing the compounds 14 can be fully exerted.

Figure 3:
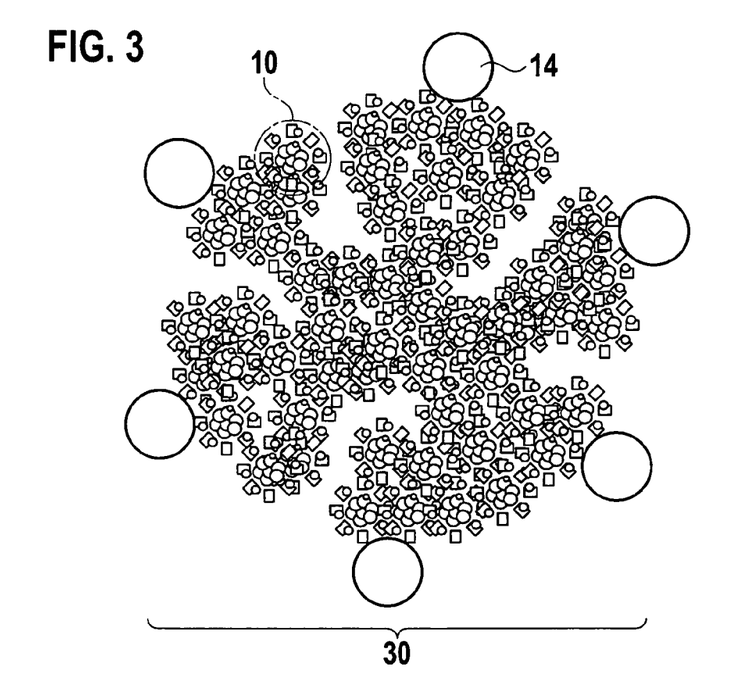
FIG. 3 is a schematic view of catalyst powder in an exhaust gas purifying catalyst serving as another embodiment of the present invention.

FIG. 3 is a schematic view of catalyst powder 30, showing another example of the exhaust gas purifying catalyst according to the present invention, in which the compounds 14 as the promoter component are disposed so as to contact the second oxides 13. The catalyst powder 30 shown in FIG. 3 is one formed of an aggregate of plural pieces of the catalyst particle units 10 shown in FIG. 1. The aggregate of the catalyst particle units 10 forms micropores of the catalyst powder. Then, compounds 14 as a promoter component are provided in contact with an outer circumferential portion of the catalyst powder 30. The compounds 14 are provided so as to contact the second oxides 13 of the catalyst particle units 10 as constituents of the catalyst powder 30 as described above, whereby the closure of the micropores of the catalyst particle units is suppressed effectively, and at the same time, the compounds 14 as the promoter component are provided close to the noble metal particles 11, and the effect of containing the compounds 14 can be fully exerted.

Note that, in the example shown in FIG. 3, an example is shown, where the catalyst powder 30 is the aggregate of the catalyst particle units 10; however, the constituents of the catalyst powder 30 are not limited to the catalyst particle units 10. For example, the constituents may be the catalyst particle units 20 shown in FIG. 2. Alternatively, the constituents may be catalyst particle units which do not directly contain the second oxides 13 therein, are composed of the noble metal particles 11, the first oxides 12 and the second oxides 13, in which the noble metal particles 11 are supported on the first oxides 12, and the first oxides 12 supporting the noble metal particles 11 are covered with the second oxides 13. Alternatively, the constituents may be a mixture of these catalyst particle units.

In the examples shown in FIG. 1 to FIG. 3, examples are explained, where the compounds as the promoter component are disposed in contact with the second oxides of the catalyst particle units; however, the exhaust gas purifying catalyst according to the present invention is not limited to these examples. As another example, there is an example where, in the catalyst particle unit that includes at least: the noble metal having the catalytic function; the fist oxides on which the noble metal is supported; and the second oxides covering the first oxides on which the noble metal is supported, oxides in which the second oxides and the compounds as the promoter component are complexed are formed. For example, when the second oxides are $Al_2O_3$, and the promoter component is Ba, $BaAl_2O_4$ as a complex oxide can be contained. Even in this example where the above-described complex oxide is contained in the catalyst particle unit, in a similar way to the examples explained by using FIG. 1 to FIG. 3, the closure of the catalyst micropores is suppressed, and at the same time, such compounds as the promoter component are provided close to the noble metal particle, and the effect of containing the compounds be fully exerted. Furthermore, by performing the above-described complexing, the promoter component can be micro-granulated, and hence, it becomes possible to extract a function of the promoter more.

As means for obtaining the exhaust gas purifying catalyst according to the present invention, a measure becomes effective, which is for keeping the micropore disclosure to the minimum by blending the compounds as the promoter component together with the second oxides when the first oxides supporting the noble metal particle are covered with the second oxides, and a method becomes effective, which is for forming a catalyst layer by blending the compounds as the promoter component with catalyst powder that is composed of the noble metal particle, the first oxides and the second oxides and has an anchor coveraged structure according to the present invention. As another method, a method is considered, which is for forming, in different layers, the compounds as the promoter component and the powder that is composed of the noble metal particle, the first oxides and the second oxides and has the anchor coveraged structure.

Figure 4:
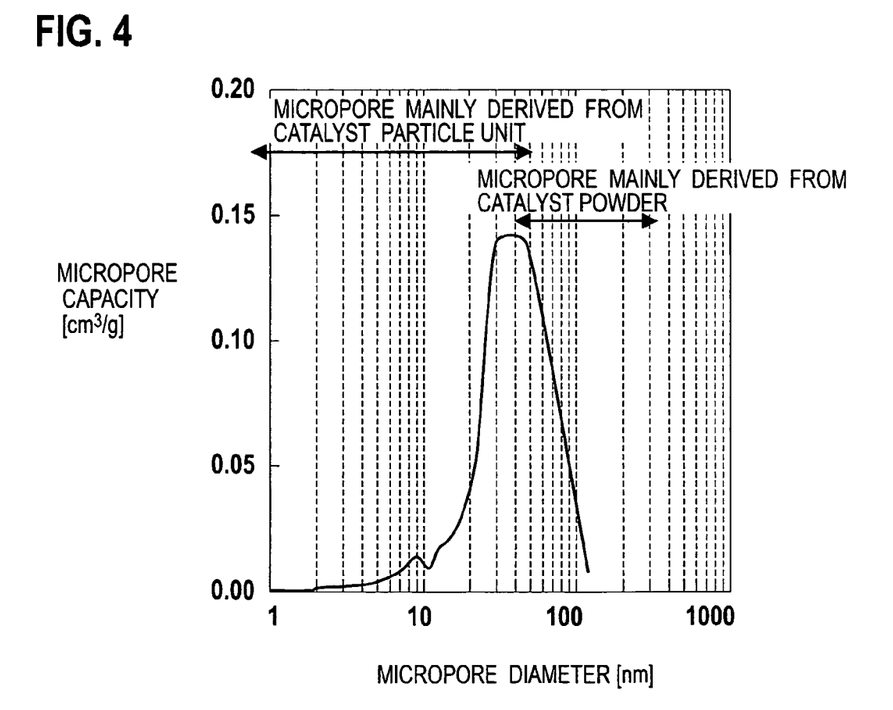
FIG. 4 is a graph showing an example of a relationship between a micropore diameter and an overall capacity of micropores.

In the exhaust gas purifying catalyst according to the present invention, it is preferable that a capacity of the micropores with a micropore diameter of 100 nm or less be 0.20 $cm^3$/g or more. In the catalyst of the present invention, the noble metal and the first oxides as the anchor members are covered with the second compounds which are covering members such as alumina. Therefore, it becomes more important to improve gas diffusibility even than catalyst formed by the conventional impregnation method. FIG. 4 is a graph showing an example of a relationship between the micropore diameter of the catalyst coated on a honeycomb carrier and the capacity of the micropores thereof, which is obtained in accordance with a BJH method. As shown in FIG. 4, the capacity of the micropores with a micropore diameter of 100 nm or less is mainly derived from the catalyst powder. The exhaust gas cannot fully reach the catalyst active site of the noble metal and the like unless the above-described capacity is ensured to some extent. The inventors assiduously examined an appropriate capacity of the micropores, and found that, particularly under a condition where the capacity of the micropores with a micropore diameter of 100 nm or less is 0.20 $cm^3$/g or more, the exhaust gas can fully reach the catalyst active site, and such a desired effect of adding the promoter can be exerted.

As a suitable example of a combination of the noble metal, the first oxides, the second oxides and the compounds as the promoter component in the exhaust gas purifying catalyst according to the present invention, one is mentioned, in which the catalyst noble metal is Pt, the first oxides are oxides containing at least Ce, the second oxides are oxides containing at least Al, the compounds as the promoter component are at least one of an oxide, a carbonate and a sulfate, which contains at least one selected from the group consisting of Na, K, Cs, Ba, Fe, Ni, Mn, Ce, La and Zr. In the case of using Pt as such a noble metal component, compounds containing Ce are effective as the first oxides which are the anchor members. Moreover, $Al_2O_3$ becomes effective as the second oxides which are the covering members also in terms of ensuring the capacity of the micropores. Each of Na, K, Cs, Ba, Fe, Ni, Mn, Ce, La and Zr is a component having an effect as the promoter. When the compounds as the promoter are an oxide or carbonate of at least one selected from the group consisting of Na, K, Cs and Ba, the compounds have a function as an adsorption material of $NO_x$. Moreover, the oxides of Fe, Ni and Mn function to assist the noble metal activity itself. Furthermore, the oxides of Ce, La and Zr function as oxygen storage/release materials or durability enhancement materials of the covering members. The compounds are not limited to those of the above-described components, and may be carbonates and sulfates.

As another suitable example of the combination of the noble metal, the first oxides, the second oxides and the compounds as the promoter component in the exhaust gas purifying catalyst according to the present invention, one is mentioned, in which the catalyst noble metal is Pd, the first oxides are oxides containing at least one of Ce and Zr, the second oxides are the oxides containing at least Al, the compounds as the promoter component are at least one of the oxide, the carbonate and the sulfate, which contains at least one selected from the group consisting of Na, K, Cs, Ba, Fe, Ni, Mn, Ce, La and Zr. In the case of using Pd as such a noble metal component, compounds containing Ce and/or Zr are effective as the first oxides which are the anchor members. Moreover, $Al_2O_3$ becomes effective as the second oxides which are the covering members also in terms of ensuring the capacity of the micropores. Each of Na, K, Cs, Ba, Fe, Ni, Mn, Ce, La and Zr is a component having the effect as the promoter. When the compounds as the promoter are the oxide or carbonate of at least one selected from the group consisting of Na, K, Cs and Ba, the compounds have a function as the adsorption material of $NO_x$. When the compounds are the sulfate, this is effective to relieve HC poisoning. Moreover, the oxides of Fe, Ni and Mn function to assist the noble metal activity itself. Furthermore, the oxides of Ce, La and Zr function as the oxygen storage/release materials or the durability enhancement materials of the covering members.

As another suitable example of the combination of the noble metal, the first oxides, the second oxides and the compounds as the promoter component in the exhaust gas purifying catalyst according to the present invention, one is mentioned, in which the catalyst noble metal is Rh, the first oxides are oxides containing at least Zr, the second oxides are the oxides containing at least Al, the compounds as the promoter component are at least one of the oxide, the carbonate and the sulfate, which contains at least one selected from the group consisting of Fe, Ni, Mn, Ce, La and Zr. In the case of using Rh as such a noble metal component, compounds containing Zr are effective as the first oxides which are the anchor members. Moreover, $Al_2O_3$ becomes effective as the second oxides which are the covering members also in terms of ensuring the capacity of the micropores. Each of Fe, Ni, Mn, Ce, La and Zr is a component having the effect as the promoter. When the compounds as the promoter are an oxide of at least one selected from the group consisting of Fe, Ni and Mn, the compounds have a function to assist the noble metal activity itself. Moreover, the oxides of Ce, La and Zr have a function as the oxygen storage/release materials or the durability enhancement materials of the covering members. The compounds are not limited to those of the above-described components, and may be carbonates and sulfates.

In each of the above-described examples, $Al_2O_3$ is suitable as the second oxides. It is preferable that $Al_2O_3$ be formed of boehmite as a raw material.

Then, a description will be made of a suitable example of a producing method of the exhaust gas purifying catalyst according to the present invention. First, the catalyst noble metal is supported on the first compounds, and then the first compounds supporting the catalyst noble metal are covered with boehmite as the raw material of the second compounds and the compounds as the promoter component. Thereafter, a resultant is fired at 500° C. or more. By using boehmite as the raw material, $Al_2O_3$ suitable as the second compounds can be obtained. Then, when the noble metal and the first oxides as the anchor members are covered with the second oxides as the covering members, the noble metal and the first oxides are covered with a mixture of the second oxides and the compounds as the promoter. In such a way, the micropore capacity of the second oxides can be prevented from being reduced, and the promoter component can be provided closest to the noble metal. Moreover, the above-described resultant is fired at 500° C. or more, thus also making it possible to complex the compounds as the promoter and the second oxides. In such a way, it becomes further possible to suppress the micropore closure, and to provide the promoter close to the noble metal.

The exhaust gas purifying catalyst according to the present invention is formed by being coated on inner walls of through holes formed in a honeycomb-structure base member made of a fire-resistant inorganic material, and the exhaust gas purifying catalyst turns to a mode of a catalyst-coated layer. Although the catalyst-coated layer may be one in which the exhaust gas purifying catalyst according to the present invention is coated as a single layer, it is preferable that the exhaust gas purifying catalyst have at least two catalyst-coated layers. This is because, in the case of forming a plurality of layers different in type of the catalyst noble metal, characteristics of the catalyst noble metals are fully used, thus making it possible to enhance the catalyst performance.

When at least two catalyst-coated layers are provided, preferably, the catalyst of the suitable example, in which the above-described noble metal is Pt and/or Pd, is contained on an inner layer side of the catalyst-coated layers, and the catalyst of the suitable example, in which the above-described noble metal is Rh, is contained on a surface layer side of the catalyst-coated layers. This is because, in the case of considering the gas diffusibility, a further effect of enhancing the catalyst activity is obtained when the catalyst containing Rh is disposed on the surface layer side having high contact with the gas.

Moreover, as another preferable mode where at least two catalyst-coated layers are provided, the catalyst of the suitable example, in which the above-described noble metal is Pt and/or Pd, is contained on the inner layer side of the catalyst-coated layers, and the catalyst of the suitable example, in which the above-described noble metal is Pt and/or Pd and Rh, is contained on the surface layer side of the catalyst-coated layers. Not only Rh but also Pt and/or Pd can be contained on the surface layer side. Also in this case, the catalyst containing Rh is disposed on the surface layer side having high contact with the gas in consideration for the gas diffusibility, whereby the further effect of enhancing the catalyst activity is obtained.

EXAMPLES

A description will be specifically made below of the present invention through examples.

Example 1

Example 1 is an example where $CeO_2$ as the promoter component is blended with the catalyst powder that is composed of the noble metal particles, the first oxides and the second oxides and has the anchor coverage structure, whereby the catalyst layer is formed.

A dinitrodiamine Pt solution was supported on $CeO_2$ powder with a specific surface area of 70 $m^2/g$ so that a support concentration thereof could be 0.5 wt % in conversion to Pt. Subsequently, a resultant thus obtained was dried at 150° C. day and night, and was then fired at 400° C. for an hour, and Pt (0.5 wt %)/$CeO_2$ powder was obtained. The Pt-supported $CeO_2$ powder was milled, and Pt/$CeO_2$ powder with an average particle diameter (D50) of 200 nm was obtained.

Meanwhile, boehmite, nitric acid and water were mixed together, and were stirred for an hour. The above-described Pt/$CeO_2$ powder was slowly put into a liquid after being stirred, and was further stirred for two hours. After being stirred, this liquid was dried at 80° C. for three hours under a reduced pressure. Moreover, a resultant thus obtained by the drying was fired in the air at 550° C. for three hours, and raw material powder of the catalyst particle units was obtained. A ratio of the Pt-supported $CeO_2$ powder and $Al_2O_3$ in this powder is 50:50.

The raw material powder of the catalyst particle units was dispersed into water, and into the water having the raw material powder dispersed thereinto, a Ce nitrate solution was impregnated so that a support concentration in conversion to $CeO_2$ could be 5 wt % with respect to the raw material powder of the respective catalyst particle units. In such a way, catalyst powder was obtained.

The catalyst powder of 225 g, alumina sol of 25 g, water of 240 g and nitric acid of 10 g were put into a magnetic ball mill, followed by mixing and milling, and catalyst slurry was obtained. This slurry was adhered onto a cordierite monolithic carrier (0.12 L, 400 cells), and excessive slurry in the cells was removed therefrom in an airflow, followed by drying at 130° C. and firing at 400° C. for an hour. In such a way, a catalyst layer with a coated layer of 200 g/L was obtained.

Example 2

Example 2 is an example where, when the first oxides supporting the noble metal particles are covered with the second oxides, $CeO_2$ as the promoter component was blended together with the second oxides, whereby the catalyst layer is formed.

Boehmite, a Ce nitrate solution and water were mixed together, and were stirred for an hour. Subsequently, into this liquid, the Pt-supported $CeO_2$ powder of Example 1 was put slowly, and was further stirred for two hours. After being stirred, this liquid was dried at 80° C. for three hours under a reduced pressure. Moreover, a resultant thus obtained by the drying was fired in the air at 550° C. for three hours, and catalyst powder was obtained. A support concentration of Ce in conversion to $CeO_2$ was set at 5 wt % with respect to the catalyst powder. A ratio of the Pt-supported $CeO_2$ powder and the impregnated $CeO_2$ and $Al_2O_3$ in this catalyst powder is 50:50.

The catalyst powder of 225 g, alumina sol of 25 g, water of 240 g and nitric acid of 10 g were put into a magnetic ball mill, followed by mixing and milling, and catalyst slurry was obtained. This slurry was adhered onto a cordierite monolithic carrier (0.12 L, 400 cells), and excessive slurry in the cells was removed therefrom in an airflow, followed by drying at 130° C. and firing at 400° C. for an hour. In such a way, a catalyst layer with a coated layer of 200 g/L was obtained.

Example 3

Example 3 is the same as Example 2 except that the catalyst powder was further fired in the air at 700° C. for an hour after the step of obtaining the catalyst powder in Example 2. The catalyst powder was further fired at 700° C., whereby complexing of $CeO_2$ and $Al_2O_3$ was achieved.

Reference Example 1

Reference example 1 is an example where the $CeO_2$ powder as the promoter component is formed, in different layers, on outer surfaces of the catalyst powder formed of the aggregates of the catalyst particle units.

The raw material powder of the catalyst particle units of Example 1, of which weight is 213.8 g, $CeO_2$ powder of 11.2 g, alumina sol of 25 g, water of 240 g and nitric acid of 10 g were put into a magnetic ball mill, followed by mixing and milling, and catalyst slurry was obtained. This slurry was adhered onto a cordierite monolithic carrier (0.12 L, 400 cells), and excessive slurry in the cells was removed therefrom in an airflow, followed by drying at 130° C. and firing at 400° C. for an hour. In such a way, a catalyst layer with a coated layer of 200 g/L was obtained.

Comparative Example 1

Comparative example 1 is an example of catalyst that does not have the anchor coverage structure.

A Ce nitrate solution was supported on $Al_2O_3$ with a specific surface area of 190 $m^2$/g so that a support concentration of Ce could be 55 wt % in conversion to $CeO_2$. Subsequently, a resultant thus obtained was dried at 150° C. day and night, and was then fired at 400° C. for an hour. On the powder thus obtained, a dinitrodiamine Pt solution was supported so that a support concentration thereof could be 0.5 wt %. After Pt was supported, the powder was dried at 150° C. day and night, followed by firing at 400° C. for an hour.

The powder after being fired, of which weight is 225 g, alumina sol of 25 g, water of 240 g and nitric acid of 10 g were put into a magnetic ball mill, followed by mixing and milling, and catalyst slurry was obtained. This slurry was adhered onto a cordierite monolithic carrier (0.12 L, 400 cells), and excessive slurry in the cells was removed therefrom in an airflow, followed by drying at 130° C. and firing at 400° C. for an hour. In such a way, a catalyst layer with a coated layer of 200 g/L was obtained.

Monolithic carriers having the catalyst layers of Examples 1 to 3, Reference example 1 and Comparative example 1, which are described above, were mounted on an exhaust system of a gasoline engine with a displacement of 3500 $cm^3$, and a durability test in which the gasoline engine was operated for 30 hours was conducted under a condition where a catalyst inlet temperature was set at 700° C. After this durability test, these monolithic carriers were mounted on the exhaust system of the gasoline engine with a displacement of 3500 $cm^3$, the catalyst inlet temperature was raised from 150° C. to 500° C. at a rate of 10° C./minute, and 50%-conversion-rate temperatures of an HC conversion rate, a CO conversion rate and a $NO_x$ conversion rate at this time were investigated. Calculation expressions of these conversion rates are as the following Expressions (1) to (3).

$$\text{HC conversion rate}(\%) = [(\text{catalyst inlet HC concentration}) - (\text{catalyst outlet HC concentration})]/(\text{catalyst inlet HC concentration}) \times 100 \quad (1)$$

$$\text{CO conversion rate}(\%) = [(\text{catalyst inlet CO concentration}) - (\text{catalyst outlet CO concentration})]/(\text{catalyst inlet CO concentration}) \times 100 \quad (2)$$

$$NO_x \text{ conversion rate}(\%) = [(\text{catalyst inlet } NO_x \text{ concentration}) - (\text{catalyst outlet } NO_x \text{ concentration})]/(\text{catalyst inlet } NO_x \text{ concentration}) \times 100 \quad (3)$$

Temperatures at which the conversion rates obtained by the above-described calculation expressions became 50% were defined to be the 50%-conversion-rate temperatures. It can be said that catalysts in which such temperatures are lower have better low-temperature activity.

Table 1 shows results of obtaining capacities of micropores with a diameter of 100 nm or less and the 50%-conversion-rate temperatures after the durability test for the catalyst layers of Examples 1 to 3, Reference example 1 and Comparative example 1, which are described above.

TABLE 1

|  | Noble metal A | Oxide B | Oxide C | Compound D | Capacity of micropores with diameter of 100 nm or less (cm³/g) | 50%-conversion-rate temperature after durability (° C.) | | |
|---|---|---|---|---|---|---|---|---|
|  |  |  |  |  |  | HC | CO | NOx |
| Example 1 | Pt | CeO₂ | Al₂O₃ | CeO₂ | 0.35 | 361 | 354 | 356 |
| Example 2 | Pt | CeO₂ | Al₂O₃ | CeO₂ | 0.39 | 342 | 338 | 340 |
| Example 3 | Pt | CeO₂ | Al₂O₃ | CeO₂ | 0.39 | 345 | 341 | 341 |
| Reference example 1 | Pt | CeO₂ | Al₂O₃ | CeO₂ | 0.49 | 371 | 365 | 366 |
| Comparative example 1 | Pt | — | — | CeO₂ | 0.48 | 455 | 448 | 449 |

As understood from Table 1, the catalysts of Examples 1 to 3 and Reference example 1, which were according to the present invention, were catalyst in which the 50%-conversion-rate temperatures were low and the low-temperature activity was good. Among them, the catalysts of Example 2 and Example 3 had lower 50%-conversion-rate temperatures than Example 1 and Reference example 1, and were provided with excellent catalyst characteristics.

Example 4

Example 4 is an example where a catalyst structure is similar to that of Example 2, and a micropore capacity is different from that of Example 2.

Example 4 is the same as Example 2 except that, in the drying step in the process of obtaining the catalyst powder, the mixed solution was sprayed from a nozzle onto a hot plate at 400° C., followed by drying.

Example 5

Example 5 is an example where a catalyst structure is similar to that of Example 2, and a micropore capacity is different from that of Example 2.

Example 5 is the same as Example 2 except that, in the drying step in the process of obtaining the catalyst powder, the temperature at the drying under the reduced pressure was set at 60° C., and the drying time was set at 24 hours.

Table 2 shows results of obtaining the capacities of the micropores with a diameter of 100 nm or less and the 50%-conversion-rate temperatures after the durability test for the catalyst layers of Example 2 and Example 3.

Moreover, as a result of comparing Example 5 with Examples 2 and 4, it is understood that, by the fact that the capacity of the micropores with a diameter of 100 nm or less is 0.2 cm³/g, the catalyst is obtained, in which the 50%-conversion-rate temperature after the durability test is low, and the low-temperature activity is good.

Example 6

Example 6 is an example where the compounds as the promoter component are complex oxides of Ce and Zr.

Boehmite, a Ce nitrate solution, Zr nitrate and water were mixed together, and were stirred for an hour. Next, into this liquid, the Pt-supported CeO₂ powder of Example 1 was put slowly, and was further stirred for two hours. After being stirred, this liquid was dried at 80° C. for three hours under a reduced pressure. Moreover, a resultant thus obtained by the drying was fired in the air at 550° C. for three hours, and raw material powder of the catalyst particle units was obtained. With respect to this powder, a support concentration of Ce in conversion to CeO₂ was set at 5 wt %, and a support concentration of Zr in conversion to ZrO₂ was set at 5 wt %. A ratio of the Pt-supported CeO₂ powder and the impregnated CeO₂ and Al₂O₃ in the raw material powder of the catalyst particle units is 50:50.

Such catalyst particle unit raw material powder of 225 g, alumina sol of 25 g, water of 240 g and nitric acid of 10 g were put into a magnetic ball mill, followed by mixing and milling, and catalyst slurry was obtained. This slurry was adhered onto

TABLE 2

|  | Noble metal A | Oxide B | Oxide C | Compound D | Capacity of micropores with diameter of 100 nm or less (cm³/g) | 50%-conversion-rate temperature after durability (° C.) | | |
|---|---|---|---|---|---|---|---|---|
|  |  |  |  |  |  | HC | CO | NOx |
| Example 2 | Pt | CeO₂ | Al₂O₃ | CeO₂ | 0.39 | 342 | 338 | 340 |
| Example 4 | Pt | CeO₂ | Al₂O₃ | CeO₂ | 0.51 | 332 | 325 | 323 |
| Example 5 | Pt | CeO₂ | Al₂O₃ | CeO₂ | 0.18 | 421 | 415 | 413 |

As understood from Table 2, the catalyst of Example 4 was catalyst in which the capacity of the micropores with a diameter of 100 nm or less was larger, the 50%-conversion-rate temperature after the durability test was lower, and the low-temperature activity was better than those of Example 2.

a cordierite monolithic carrier (0.12 L, 400 cells), and excessive slurry in the cells was removed therefrom in an airflow, followed by drying at 130° C. and firing at 400° C. for an hour. In such a way, a catalyst layer with a coated layer of 200 g/L was obtained.

Example 7

Example 7 is an example where the first oxides are complex oxides of Ce and Zr, and the compounds as the promoter component are complex oxides of Ce and Zr.

A dinitrodiamine Pt solution was supported on the complex oxides (specific surface area: 65 m$^2$/g) of Ce and Zr so that a support concentration thereof could be 0.5 wt % in conversion to Pt. After Pt was supported, a resultant thus obtained was dried at 150° C. day and night, and was then fired at 400° C. for an hour, and Pt (0.5 wt %)/CeZrO$_x$ powder was obtained. This powder was milled, and Pt/CeZrO$_x$ powder with an average particle diameter (D50) of 150 nm was obtained.

Meanwhile, boehmite, a Ce nitrate solution, Zr nitrate and water were mixed together, and were stirred for an hour. Into the liquid after being stirred, the above-described Pt/CeZrO$_x$ powder was slowly put, and was further stirred for two hours. After being stirred, this liquid was dried at 80° C. for three hours under a reduced pressure. Moreover, a resultant thus obtained by the drying was fired in the air at 550° C. for three hours, and raw material powder of the catalyst particle units was obtained. With respect to this powder, a support concentration of Ce in conversion to CeO$_2$ was set at 5 wt %, and a support concentration of Zr in conversion to ZrO$_2$ was set at 5 wt %. Moreover, a ratio of the Pt/CeZrO$_x$ powder and the impregnated CeO$_2$+the impregnated ZrO$_2$+Al$_2$O$_3$ in this powder is 50:50.

Such catalyst particle unit raw material powder of 225 g, alumina sol of 25 g, water of 240 g and nitric acid of 10 g were put into a magnetic ball mill, followed by mixing and milling, and catalyst slurry was obtained. This slurry was adhered onto a cordierite monolithic carrier (0.12 L, 400 cells), and excessive slurry in the cells was removed therefrom in an airflow, followed by drying at 130° C. and firing at 400° C. for an hour. In such a way, a catalyst layer with a coated layer of 200 g/L was obtained.

Example 8

Example 8 is an example where the compounds as the promoter component are La$_2$O$_3$.

Catalyst of Example 8 was produced under the same conditions as those of the above-described Example 7 except that the raw materials to be mixed in the water together with the boehmite were changed to La nitrate from the Ce nitrate and the Zr nitrate in Example 7 (support concentration of La is 5 wt % in conversion to La$_2$O$_3$). A ratio of the Pt/CeZrO$_x$ powder and La$_2$O$_3$+Al$_2$O$_3$ is 50:50.

Example 9

Example 9 is an example where the compounds as the promoter component are complex oxides of Ce and Zr, and La$_2$O$_3$.

Catalyst of Example 9 was produced under the same conditions as those of the above-described Example 7 except that the raw materials to be mixed in the water together with the boehmite were prepared by adding La nitrate to the Ce nitrate and the Zr nitrate in Example 7 (support concentration of Ce is 5 wt % in conversion to CeO$_2$, support concentration of Zr is 3 wt % in conversion to ZrO$_2$, and support concentration of La is 3 wt % in conversion to La$_2$O$_3$). A ratio of the Pt/CeZrO$_x$ powder and CeO$_2$+ZrO$_2$+La$_2$O$_3$+Al$_2$O$_3$ is 50:50.

Example 10

Example 10 is an example where the compounds as the promoter component are Na$_2$O.

Catalyst of Example 10 was produced under the same conditions as those of the above-described Example 7 except that the raw materials to be mixed in the water together with the boehmite were changed to Na acetate from the Ce nitrate and the Zr nitrate in Example 7 (support concentration of Na is 3 wt % in conversion to Na$_2$O). A ratio of the Pt/CeZrO$_x$ powder and Na$_2$O+Al$_2$O$_3$ is 50:50.

Example 11

Example 11 is an example where the compounds as the promoter component are K$_2$O.

Catalyst of Example 11 was produced under the same conditions as those of the above-described Example 7 except that the raw materials to be mixed in the water together with the boehmite were changed to K acetate from the Ce nitrate and the Zr nitrate in Example 7 (support concentration of K is 3 wt % in conversion to K$_2$O). A ratio of the Pt/CeZrO$_x$ powder and K$_2$O+Al$_2$O$_3$ is 50:50.

Example 12

Example 12 is an example where the compounds as the promoter component are Cs$_2$O.

Catalyst of Example 12 was produced under the same conditions as those of the above-described Example 7 except that the raw materials to be mixed in the water together with the boehmite were changed to Cs acetate from the Ce nitrate and the Zr nitrate in Example 7 (support concentration of Cs is 3 wt % in conversion to Cs$_2$O). A ratio of the Pt/CeZrO$_x$ powder and Cs$_2$O+Al$_2$O$_3$ is 50:50.

Example 13

Example 13 is an example where the compounds as the promoter component are BaO.

Catalyst of Example 13 was produced under the same conditions as those of the above-described Example 7 except that the raw materials to be mixed in the water together with the boehmite were changed to Ba acetate from the Ce nitrate and the Zr nitrate in Example 7 (support concentration of Ba is 3 wt % in conversion to BaO). A ratio of the Pt/CeZrO$_x$ powder and BaO+Al$_2$O$_3$ is 50:50.

Example 14

Example 14 is an example where the compounds as the promoter component are Fe$_2$O$_3$.

Catalyst of Example 14 was produced under the same conditions as those of the above-described Example 7 except that the raw materials to be mixed in the water together with the boehmite were changed to Fe nitrate from the Ce nitrate and the Zr nitrate in Example 7 (support concentration of Fe is 5 wt % in conversion to $Fe_2O_3$). A ratio of the Pt/CeZrO$_x$ powder and $Fe_2O_3+Al_2O_3$ is 50:50.

Example 15

Example 15 is an example where the compounds as the promoter component are $Ni_2O_3$.

Catalyst of Example 15 was produced under the same conditions as those of the above-described Example 7 except that the raw materials to be mixed in the water together with the boehmite were changed to Ni nitrate from the Ce nitrate and the Zr nitrate in Example 7 (support concentration of Ni is 5 wt % in conversion to $Ni_2O_3$). A ratio of the Pt/CeZrO$_x$ powder and $Ni_2O_3+Al_2O_3$ is 50:50.

Example 16

Example 16 is an example where the compounds as the promoter component are $Mn_2O_3$.

Catalyst of Example 16 was produced under the same conditions as those of the above-described Example 7 except that the raw materials to be mixed in the water together with the boehmite were changed to Mn nitrate from the Ce nitrate and the Zr nitrate in Example 7 (support concentration of Mn is 5 wt % in conversion to $Mn_2O_3$). A ratio of the Pt/CeZrO$_x$ powder and $Mn_2O_3+Al_2O_3$ is 50:50.

Example 17

Example 17 is an example where the noble metal is Pd, and the compounds as the promoter component are $BaSO_4$.

A Pd nitrate solution was supported on $CeO_2$ powder with a specific surface area of 70 m$^2$/g so that a support concentration thereof could be 1.0 wt % in conversion to Pd. After Pd was supported, a resultant thus obtained was dried at 150° C. day and night, and was then fired at 400° C. for an hour, and Pd (1.0 wt %)/$CeO_2$ powder was obtained. This powder was milled, and Pd/$CeO_2$ powder with an average particle diameter (D50) of 170 nm was obtained.

Meanwhile, boehmite, Ba acetate, nitric acid and water were mixed together, and were stirred for an hour. Into the liquid after being stirred, the above-described Pd/$CeO_2$ powder was slowly put, and was further stirred for two hours. This liquid was dried at 80° C. for three hours under a reduced pressure. Moreover, a resultant thus obtained by the drying was fired in the air at 550° C. for three hours, and raw material powder of the catalyst particle units was obtained. With respect to this powder, a support concentration of Ba in conversion to $BaSO_4$ was set at 5 wt %. Moreover, a ratio of the Pd/$CeO_2$ powder and $BaSO_4+Al_2O_3$ in this powder is 50:50.

Such catalyst particle unit raw material powder of 225 g, alumina sol of 25 g, water of 240 g and nitric acid of 10 g were put into a magnetic ball mill, followed by mixing and milling, and catalyst slurry was obtained. This slurry was adhered onto a cordierite monolithic carrier (0.12 L, 400 cells), and excessive slurry in the cells was removed therefrom in an airflow, followed by drying at 130° C. and firing at 400° C. for an hour. In such a way, a catalyst layer with a coated layer of 200 g/L was obtained.

Example 18

Example 18 is an example where the compounds as the promoter component are $Fe_2O_3$.

Catalyst of Example 18 was produced under the same conditions as those of the above-described Example 17 except that the raw materials to be mixed in the water together with the boehmite were changed to Fe nitrate from the Ba acetate and the nitric acid in Example 17 (support concentration of Fe is 5 wt % in conversion to $Fe_2O_3$). A ratio of the Pd/$CeO_2$ powder and $Fe_2O_3+Al_2O_3$ is 50:50.

Example 19

Example 19 is an example where the compounds as the promoter component are $Ni_2O_3$.

Catalyst of Example 19 was produced under the same conditions as those of the above-described Example 17 except that the raw materials to be mixed in the water together with the boehmite were changed to Ni nitrate from the Ba acetate and the nitric acid in Example 17 (support concentration of Ni is 5 wt % in conversion to $Ni_2O_3$). A ratio of the Pd/$CeO_2$ powder and $Ni_2O_3+Al_2O_3$ is 50:50.

Example 20

Example 20 is an example where the compounds as the promoter component are complex oxides of Ce and Zr.

Catalyst of Example 20 was produced under the same conditions as those of the above-described Example 17 except that the raw materials to be mixed in the water together with the boehmite were changed to Ce nitrate and Zr nitrate from the Ba acetate and the nitric acid in Example 17 (support concentration of Ce is 5 wt % in conversion to $CeO_2$, and support concentration of Zr is 5 wt % in conversion to $ZrO_2$). A ratio of the Pd/$CeO_2$ powder and $CeO_2+ZrO_2+Al_2O_3$ is 50:50.

Example 21

Example 21 is an example where the first oxides are $ZrO_2$.

Catalyst of Example 21 was produced under the same conditions as those of the above-described example 20 except that the $CeO_2$ powder with a specific surface area of 70 m$^2$/g, which is a raw material of the Pd/$CeO_2$ powder in Example 20, was changed to $ZrO_2$ powder with a specific surface area of 50 m$^2$/g.

Example 22

Example 22 is an example where the noble metal is Rh, and both of the first oxides and the compounds as the promoter component are $ZrO_2$.

A Rh nitrate solution was supported on $ZrO_2$ powder with a specific surface area of 50 m$^2$/g so that a support concentration thereof could be 0.3 wt % in conversion to Rh. After Rh was supported, a resultant thus obtained was dried at 150° C. day and night, and was then fired at 400° C. for an hour, and Rh (0.3 wt %)/$ZrO_2$ powder was obtained. This powder was milled, and Rh/$ZrO_2$ powder with an average particle diameter (D50) of 160 nm was obtained.

Meanwhile, boehmite, Zr nitrate and water were mixed together, and were stirred for an hour. Into the liquid after being stirred, the above-described Rh/$ZrO_2$ powder was slowly put, and was further stirred for two hours. This liquid was dried at 80° C. for three hours under a reduced pressure. Moreover, a resultant thus obtained by the drying was fired in the air at 550° C. for three hours, and raw material powder of the catalyst particle units was obtained. With respect to this powder, a support concentration of Zr in conversion to $ZrO_2$ was set at 5 wt %. Moreover, a ratio of the $Rh/ZrO_2$ powder and $ZrO_2+Al_2O_3$ in this powder is 50:50.

Such catalyst particle unit raw material powder of 225 g, alumina sol of 25 g, water of 240 g and nitric acid of 10 g were put into a magnetic ball mill, followed by mixing and milling, and catalyst slurry was obtained. This slurry was adhered onto a cordierite monolithic carrier (0.12 L, 400 cells), and excessive slurry in the cells was removed therefrom in an airflow, followed by drying at 130° C. and firing at 400° C. for an hour. In such a way, a catalyst layer with a coated layer of 200 g/L was obtained.

Example 23

Example 23 is an example where the first oxides are complex oxides of La and Zr.

Catalyst of Example 23 was produced under the same conditions as those of the above-described example 22 except that the $ZrO_2$ powder with a specific surface area of 50 m²/g, which is a raw material of the $Rh/ZrO_2$ powder in Example 22, was changed to $LaZrO_x$ powder with a specific surface area of 55 m²/g.

Example 24

Example 24 is an example where the compounds as the promoter component are complex oxides of Ce and Zr.

Catalyst of Example 24 was produced under the same conditions as those of the above-described Example 23 except that the raw materials to be mixed in the water together with the boehmite were changed to Ce nitrate and Zr nitrate from the Zr nitrate in Example 23 (support concentration of Ce is 5 wt % in conversion to $CeO_2$, and support concentration of Zr is 5 wt % in conversion to $ZrO_2$). A ratio of the $Rh/ZrO_2$ powder and $CeO_2+ZrO_2+Al_2O_3$ is 50:50.

Example 25

Example 25 is an example where the compounds as the promoter component are $La_2O_3$.

Example 24 is an example where the compounds as the promoter component are complex oxides of Ce and Zr.

Catalyst of Example 25 was produced under the same conditions as those of the above-described Example 23 except that the raw materials to be mixed in the water together with the boehmite were changed to La nitrate from the Zr nitrate in Example 23 (support concentration of La is 5 wt % in conversion to $La_2O_3$, and support concentration of Zr is 5 wt % in conversion to $ZrO_2$). A ratio of the $Rh/ZrO_2$ powder and $La_2O_3+Al_2O_3$ is 50:50.

Table 3 shows results of obtaining the capacities of the micropores with a diameter of 100 nm or less and the 50%-conversion-rate temperatures after the durability test for the catalyst layers of the above-described Example 6 to Example 25.

TABLE 3

| | Noble metal A | Oxide B | Oxide C | Compound D | Capacity of micropores with diameter of 100 nm or less (cm³/g) | 50%-conversion-rate temperature after durability (° C.) | | |
|---|---|---|---|---|---|---|---|---|
| | | | | | | HC | CO | NOx |
| Example 6 | Pt | $CeO_2$ | $Al_2O_3$ | $CeZrOx$ | 0.37 | 340 | 337 | 336 |
| Example 7 | Pt | $CeZrOx$ | $Al_2O_3$ | $CeZrOx$ | 0.37 | 339 | 337 | 337 |
| Example 8 | Pt | $CeZrOx$ | $Al_2O_3$ | $La_2O_3$ | 0.38 | 341 | 337 | 331 |
| Example 9 | Pt | $CeZrOx$ | $Al_2O_3$ | $CeZrOx$, $La_2O_3$ | 0.35 | 340 | 336 | 336 |
| Example 10 | Pt | $CeZrOx$ | $Al_2O_3$ | $Na_2O$ | 0.36 | 343 | 339 | 328 |
| Example 11 | Pt | $CeZrOx$ | $Al_2O_3$ | $K_2O$ | 0.37 | 345 | 338 | 326 |
| Example 12 | Pt | $CeZrOx$ | $Al_2O_3$ | $Cs_2O$ | 0.35 | 345 | 338 | 325 |
| Example 13 | Pt | $CeZrOx$ | $Al_2O_3$ | $BaO$ | 0.34 | 343 | 337 | 328 |
| Example 14 | Pt | $CeZrOx$ | $Al_2O_3$ | $Fe_2O_3$ | 0.35 | 342 | 335 | 335 |
| Example 15 | Pt | $CeZrOx$ | $Al_2O_3$ | $Ni_2O_3$ | 0.34 | 341 | 336 | 334 |
| Example 16 | Pt | $CeZrOx$ | $Al_2O_3$ | $Mn_2O_3$ | 0.34 | 342 | 335 | 334 |
| Example 17 | Pd | $CeO_2$ | $Al_2O_3$ | $BaSO_4$ | 0.44 | 314 | 312 | 311 |
| Example 18 | Pd | $CeO_2$ | $Al_2O_3$ | $Fe_2O_3$ | 0.48 | 323 | 318 | 318 |
| Example 19 | Pd | $CeO_2$ | $Al_2O_3$ | $Ni_2O_3$ | 0.47 | 322 | 317 | 316 |
| Example 20 | Pd | $CeO_2$ | $Al_2O_3$ | $CeZrOx$ | 0.47 | 322 | 317 | 315 |
| Example 21 | Pd | $ZrO_2$ | $Al_2O_3$ | $CeZrOx$ | 0.37 | 328 | 323 | 322 |
| Example 22 | Rh | $ZrO_2$ | $Al_2O_3$ | $ZrO_2$ | 0.37 | 308 | 302 | 299 |
| Example 23 | Rh | $LaZrOx$ | $Al_2O_3$ | $ZrO_2$ | 0.37 | 303 | 299 | 298 |
| Example 24 | Rh | $LaZrOx$ | $Al_2O_3$ | $CeZrOx$ | 0.35 | 305 | 301 | 300 |
| Example 25 | Rh | $LaZrOx$ | $Al_2O_3$ | $La_2O_3$ | 0.36 | 304 | 301 | 300 |

As understood from Table 3, each of the catalysts of Example 6 to example 25 according to the present invention was catalyst in which the 50%-conversion-rate temperature after the durability test was low and the low-temperature activity was good.

Example 26

Example 26 is an example where the firing temperature condition at the time of the production is differentiated.

Catalyst of Example 26 was produced under the same conditions as those of Example 2 except that the firing temperature was set at 400° C. in the step of obtaining the catalyst powder in Example 2. Table 4 shows results of obtaining the capacity of the micropores with a diameter of 100 nm or less and the 50%-conversion-rate temperature after the durability test for the catalyst layers of Example 26 in combination with the results in Example 2.

Table 5 shows, in a lump, results of obtaining the capacities of the micropores with a diameter of 100 nm or less and the 50%-conversion-rate temperatures after the durability test for the catalyst layers of Example 27 to Example 33, which are described above. As understood from Table 5, each of the exhaust gas purifying catalysts according to the present

TABLE 4

|  | Noble metal A | Oxide B | Oxide C | Compound D | Aspect ratio of boehmite | Firing temperature (° C.) | 50%-conversion-rate temperature after durability (° C.) | | |
|---|---|---|---|---|---|---|---|---|---|
|  |  |  |  |  |  |  | HC | CO | NOx |
| Example 2 | Pt | CeO$_2$ | Al$_2$O$_3$ | CeO$_2$ | 1.1 | 550 | 342 | 338 | 340 |
| Example 26 | Pt | CeO$_2$ | Al$_2$O$_3$ | CeO$_2$ | 1.1 | 400 | 364 | 355 | 354 |

As understood from Table 4, the catalyst of Example 26 according to the present invention was catalyst in which the 50%-conversion-rate temperature after the durability test was low and the low-temperature activity was good in a similar way to the catalyst of Example 2. As a result of comparing Example 26 with Example 2, the catalyst in Example 2 was catalyst in which the 50%-conversion-rate temperature after the durability test is lower, and the low-temperature activity is better.

Example 27 to Example 33

Example 27 to Example 33 are examples, in each of which the catalyst-coated layer formed by being coated on the honeycomb-structure base members made of the fire-resistant inorganic material includes totally two catalyst-coated layers on the inner layer side and the surface layer side.

As shown in Table 5, the respective catalysts were disposed on cordierite monolithic carriers (1.2 L, 400 cells). The firing was performed every time when each of the layers was coated, and such firing for the two layers was performed in the air at 400° C. for an hour. The coated layers was set at 150 g/L on the inner layer side, and at 70 g/L on the surface layer side.

TABLE 5

|  | Catalyst on inner layer side | Catalyst on surface layer side | 50%-conversion-rate temperature after durability (° C.) | | |
|---|---|---|---|---|---|
|  |  |  | HC | CO | NOx |
| Example 27 | Catalyst of Example 7 | Catalyst of Example 23 | 298 | 287 | 285 |
| Example 28 | Catalyst of Example 20 | Catalyst of Example 23 | 287 | 281 | 280 |
| Example 29 | Catalysts of Examples 7 and 20 | Catalyst of Example 23 | 285 | 280 | 278 |
| Example 30 | Catalyst of Example 7 | Catalysts of Examples 7 and 23 | 295 | 285 | 284 |
| Example 31 | Catalysts of Examples 7 and 20 | Catalysts of Examples 7 and 23 | 283 | 277 | 276 |
| Example 32 | Catalysts of Examples 7 and 20 | Catalysts of Examples 7, 20 and 23 | 282 | 275 | 275 |
| Example 33 | Catalyst of Examples 23 | Catalyst of Example 7 | 310 | 305 | 304 | invention can be made to include the two catalyst-coated layers, and even in this case, was the catalyst in which the 50%-conversion-rate temperature after the durability test was low and the low-temperature activity was good. Example 33 is an example where the catalyst containing Rh is disposed on the inner layer side and is not disposed on the outer layer side. In comparison with the catalyst of Example 33, the catalysts of Example 27 to Example 32, in each of which the catalyst containing Rh is disposed on the outer layer side, were catalysts, in each of which the 50%-conversion-rate temperature after the durability test is lower, and the low-temperature activity is better.

This application is based upon and claims the benefit of priority from Patent Application No. 2007-002337 filed on Jan. 10, 2007, in the Japanese Patent Office, of which contents are incorporated herein by reference.

As above, the description has been made of the embodiments to which the invention invented by the inventors is applied; however, the present invention is not limited to the description and the drawings, which compose a part of the disclosure of the present invention according to the embodiments. Specifically, what is additionally mentioned is that, naturally, other embodiments, examples, operation technologies, and the like, which will be made by those skilled in the art based on the above-described embodiments, are entirely incorporated in the scope of the present invention.

What is claimed is:

1. An exhaust gas purifying catalyst, comprising:
noble metal particles,
first oxide particles on which the noble metal particles are supported,
second oxide particles which envelop the first oxide particles on which the noble metal particles are supported, and
at least one type of compound particles selected from the group consisting of: a transition element, an alkali earth metal element, an alkali metal element, and a rare earth element, wherein the at least one type of compound particles include promoter components,
wherein the second oxide particles contain alumina,
wherein the promoter components are located on an outside or periphery of the second oxide particles, and
wherein the noble metal particles and the first oxide particles are in a section separated from other sections by the second oxide particles so as to suppress movement of first oxide particles beyond the section separated by the second oxide particles, and so as to suppress contact and coagulation of the section with the other sections wherein a capacity of pores with a pore diameter of 100 nm or less of the exhaust gas purifying catalyst is 0.2 cm$^3$/g or more.

2. The exhaust gas purifying catalyst according to claim 1, wherein the compound particles are in contact with the second oxide particles of an aggregate of plural pieces of catalyst particle units, each of which includes the noble metal particles, the first oxide particles and the second oxide particles.

3. The exhaust gas purifying catalyst according to claim 1, wherein the second oxide particles are complexed with the promoter components.

4. The exhaust gas purifying catalyst according to claim 1, wherein the noble metal contained in the noble metal particles is Pt, the first oxide particles are oxides containing at least Ce, the second oxide particles are oxides containing at least Al, and the compound particles as the promoter components are at least one of an oxide, a carbonate and a sulfate, which contains at least one selected from the group consisting of Na, K, Cs, Ba, Fe, Ni, Mn, Ce, La and Zr.

5. The exhaust gas purifying catalyst according to claim 1, wherein the noble metal contained in the noble metal particles is Pd,
the first oxide particles are oxides containing at least Ce and Zr, the second oxide particles are oxides containing at least Al, and
the compound particles as the promoter components are at least one of an oxide, a carbonate and a sulfate, which contains at least one selected from the group consisting of Na, K, Cs, Ba, Fe, Ni, Mn, Ce, La and Zr.

6. The exhaust gas purifying catalyst according to claim 1, wherein the noble metal contained in the noble metal particles is Rh,
the first oxide particles are oxides containing at least Zr, the second oxide particles are oxides containing at least Al, and
the compound particles as the promoter components are at least one of an oxide, a carbonate and a sulfate, which contains at least one selected from the group consisting of Fe, Ni, Mn, Ce, La and Zr.

7. A method of producing the exhaust gas purifying catalyst according to claim 1, comprising:
supporting the noble metal particles on the first oxide particles;
covering the first oxide particles supporting the noble metal with a mixture of boehmite as a raw material of the second oxide particles and the compound as the promoter component; and
firing a resultant of the mixture and the noble metal particles covered therewith at 500° C. or more.

8. An exhaust gas purifying catalyst, comprising:
at least two catalyst-coated layers on inner surfaces of through holes formed in a fire-resistant inorganic base material,
wherein the exhaust gas purifying catalyst according to claim 4 is contained on an inner layer side of the catalyst-coated layers.

9. An exhaust gas purifying catalyst, comprising:
at least two catalyst-coated layers on inner surfaces of through holes formed in a fire-resistant inorganic base material,
wherein the exhaust gas purifying catalyst according to claim 5 is contained on an inner layer side of the catalyst-coated layers.

10. A method of producing the exhaust gas purifying catalyst according to claim 2, comprising:
supporting the noble metal particles on the first oxide particles;
covering the first oxide particles supporting the noble metal with a mixture of boehmite as a raw material of the second oxide particles and the compound as the promoter component; and
firing a resultant of the mixture and the noble metal particles covered therewith at 500° C. or more.

11. A method of producing the exhaust gas purifying catalyst according to claim 3, comprising:
supporting the noble metal particles on the first oxide particles;
covering the first oxide particles supporting the noble metal particles with a mixture of boehmite as a raw material of the second oxide particles and the compound as the promoter component; and
firing a resultant of the mixture and the noble metal particles covered therewith at 500° C. or more.

12. A method of producing the exhaust gas purifying catalyst according to claim 4, comprising:
supporting the noble metal on the first oxide particles;
covering the first oxide particles supporting the noble metal with a mixture of boehmite as a raw material of the second oxide particles and the compound as the promoter component; and
firing a resultant of the mixture and the noble metal covered therewith at 500° C. or more.

13. A method of producing the exhaust gas purifying catalyst according to claim 5, comprising:
supporting the noble metal on the first oxide particles;
covering the first oxide particles supporting the noble metal with a mixture of boehmite as a raw material of the second oxide particles and the compound as the promoter component; and
firing a resultant of the mixture and the noble metal covered therewith at 500° C. or more.

14. A method of producing the exhaust gas purifying catalyst according to claim 6, comprising:
supporting the noble metal on the first oxide particles;
covering the first oxide particles supporting the noble metal with a mixture of boehmite as a raw material of the second oxide particles and the compound as the promoter component; and
firing a resultant of the mixture and the noble metal covered therewith at 500° C. or more.

15. The exhaust gas purifying catalyst according to claim 1, wherein an average diameter of the first oxide particles are larger than an average diameter of pores formed in the second oxide particles.

16. The exhaust gas purifying catalyst according to claim 1, wherein the noble metal particles, the first oxide particles, and the second oxide particles are provided as catalyst particle units contained in catalyst powder,
wherein the catalyst powder is formed as an aggregate of plural pieces of the catalyst particle units.

17. The exhaust gas purifying catalyst according to claim 16, wherein the promoter components are in contact with an outer peripheral portion of the catalyst powder.

* * * * *